United States Patent Office 3,362,672
Patented Jan. 9, 1968

3,362,672
FASTENER ELEMENTS
Wilhelm Klaus Wigam, Hamburg, Germany, assignor to Illinois Tool Works Inc., Chicago, Ill.
Filed Aug. 30, 1966, Ser. No. 576,030
Claims priority, application Germany, Sept. 1, 1965, J 141,766
4 Claims. (Cl. 248—361)

The invention relates to fastener elements of plastic, in particular for fastening the back walls of radio sets.

The back walls of such units, which in the most cases are made of pressed cardboard or the like, presently in the most cases are fastened using screws. In order to retain these screws rotatably in the back wall, further elements such as washers of metal, cardboard or plastic must be secured to the screw, this resulting in a cost increase in the manufacture and in the attachment.

It is an object of the invention to provide a novel fastener element which is made in one piece of a resilient plastic material and which is capable of being readily inserted into according apertures in the back wall, the fastener element being retained rotatably in said apertures.

The fastener element according to the invention comprises a shaft, a head provided at its one end, a shoulder forming an integral part of said shaft and located approximately in its middle, and a two-armed locking lever provided at the other end of said shaft, the one arm of which is axially spaced from the shoulder engaging the back side of the workplate and is capable of engaging in an according slot of a retaining block, while the other arm extends oblique in direction to the plane defined by said shoulder and bears a semi-spherical projection at its free end for engaging an according aperture of the workplate.

This fastener element is readily capable to be inserted into the aperture and is self-retainable in the same by the head and a shoulder spaced relative to said head by the thickness of the back wall or the like.

The attachment is effected such that the head which is for instance knurled, provided with a slot or the like, for this purpose is turned upon engaging the back wall to such an extent, that the one end of the locking lever engages in an according groove in a locking or retaining block secured at the housing. The other end of the lock lever thereby engages, with its spherically shaped end in an according small aperture of the back wall and thus retains the lock lever in its locking position.

The fastener element according to the invention may be provided for insertion into a keyhole-shaped aperture of the workplate. In such an instance the shoulder is formed as a continuous annular disk.

The fastener element according to the invention, however, may also be formed in such a manner that it is capable of being inserted into a slot in the back wall or the like and is retained therein likewise rotatably. In this case, the shoulder is not shaped as continuous annular disk, but is flattened at two opposite sides. The fastener element thus is capable of being pushed through the slot in one position and may be turned into its locking position upon engagement of the front side of the plate with its head, the two halves of the shoulder gripping behind the lateral edges of the slot and retaining the fastener element rotatably in the plate.

With the above, and other objects in view that will hereinafter appear, the nature of the invention will be more clearly understood by reference to the following detailed description, the appended claims and the several views illustrated in the accompanying drawings.

The fastener element illustrated in FIGS. 1–4 includes a shaft 1 having a head 2 at its one end and a two-armed lock lever 4 at its other end. Approximately in the middle of the shaft, spaced approximately in accordance with the wall thickness of the plate for which the fastener element is to be used, an annular shoulder 3 is arranged forming an integral part with the shaft.

Figure 1:
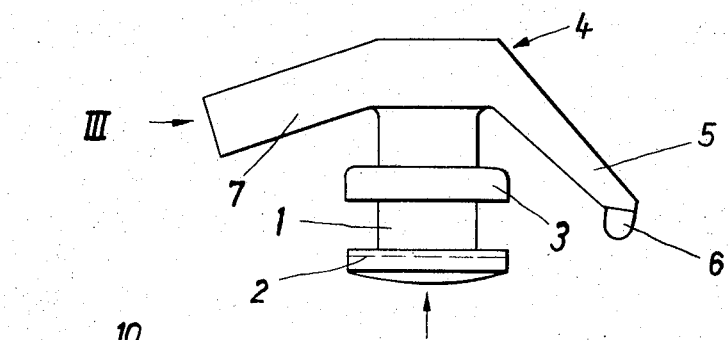
FIG. 1 is an elevational view of the fastener element according to the invention.
Figure 2:
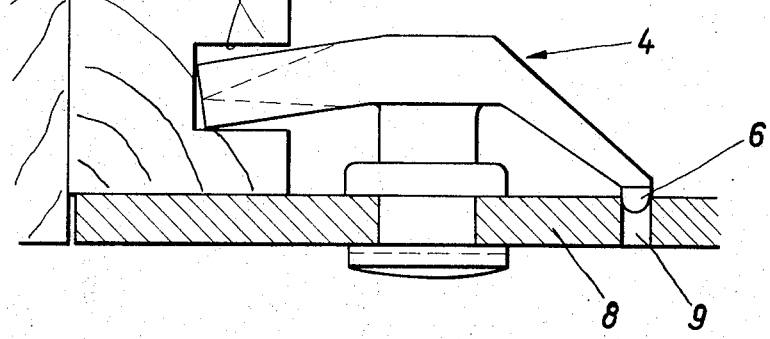
FIG. 2 is an elevational view of the fastener element of FIG. 1, inserted and locked in portions partially in section of members to be joined.
Figure 3:
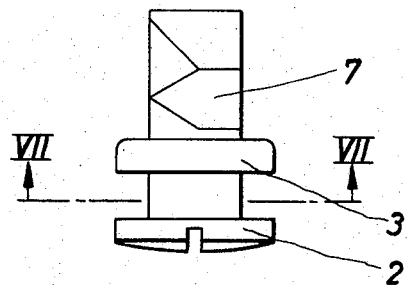
FIG. 3 is a view of the fastener element of FIG. 1 as viewed in direction of the arrow III of FIG. 1.
Figure 4:
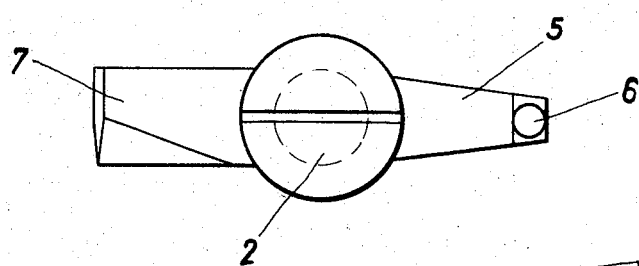
FIG. 4 is a further view of the fastener element of FIGS. 1–3 as viewed in direction to the head.

The two-armed lock lever 4 includes an arm 7 extending inclined downwardly only slightly in direction to the head, which, as disclosed in FIG. 3, is provided with roof formations at its end. This arm grips into the groove 11 of a retaining block 10 connected to the housing, as disclosed in FIG. 2, said arm resiliently being bent upon camming of the roof inclination at the bottom side of the groove 11 and thus exerting a specific retaining force onto the back wall 8. The fastener element is retained in its lock position by the other arm 5 of the lock lever, which extends under a greater inclination than the other arm 7 downwardly in direction to the workplate and has at its end a semi-sphere 6 which engages an according aperture 9 of the workplate.

Figure 5:
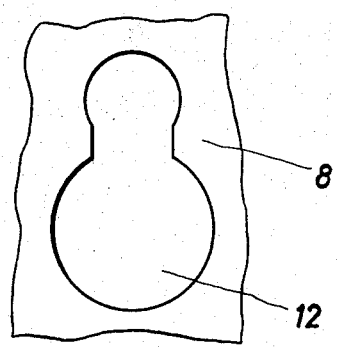
FIG. 5 is a keyhole-like aperture in a back wall.

The fastener element as illustrated in FIGS. 1–4 is inserted into a keyhole-shaped aperture 12 according to FIG. 5 in such a manner that initially the head 2 is pushed through the larger part of the aperture 12 from the inner side of the plate 8 and is then moved in direction to the smaller part of said aperture which corresponds to the diameter of the shaft 1.

Figure 6:
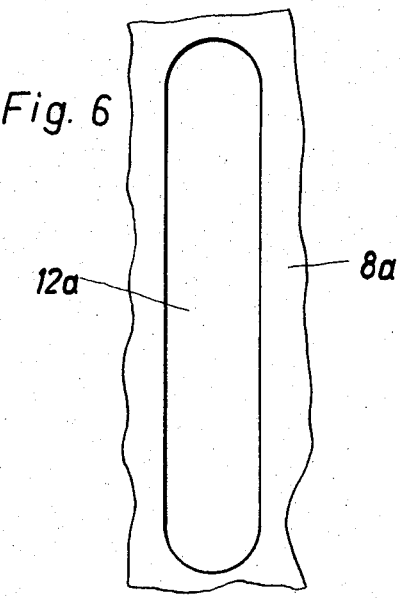
FIG. 6 is a slot hole in a back wall.
Figure 7:
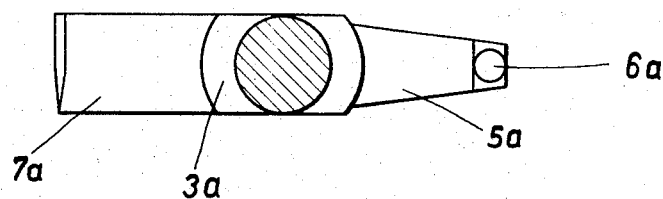
FIG. 7 is a further embodiment of the fastener element according to the invention.

The modified embodiment illustrated in FIG. 7, which represents approximately a sectional view along line VII—VII of FIG. 3, is suited for insertion into a slot hole 12a of a workplate 8a as illustrated in FIG. 6. This embodiment of the fastener element is inserted from the outer side of the workplate through the slot hole 12a initially with the lock levers 7a, 5a and then with the flattened off two-part shoulder 3a, and subsequently, after the head of the fastener element has engaged the edges of the workplate, rotated into its locking position. Thereby, the two parts of the shoulders 3a laterally project beyond the edges of the slot hole 12a and thus rotatably retain the fastener element in the workplate.

What is claimed is:

1. A fastener element comprising a shaft, a head provided at one end of said shaft, a shoulder located approximately in the middle of said shaft and forming an integral portion thereof, and a two-armed lock lever provided at a second end of said shaft, one arm of said lock lever being axially spaced from said shoulder capable of engaging a back side of a workplate, said arm further being provided for engaging in a slot of a retainer block, a second arm of said lock lever extending oblique in direction to a plane defined by said shoulder and bearing at a free end a semi-spherical projection provided for engaging in an aperture of said workplate.

2. Fastener element as defined in claim 1, wherein said shoulder is formed as a continuous annulus for rotatably retaining said fastener element in a keyhole-shaped aperture of said workplate.

3. A fastener element as defined in claim 1, wherein said shoulder is shaped as an annulus flattened at two opposite sides for rotatably retaining said fastener element in a slot of said workplate.

4. Fastener element as defined in claim 1, wherein said one arm spaced axially relative to said shoulder is formed bevelled for facilitating insertion into a groove of a fastener block as well as for obtaining a bias increasing a retaining effect.

References Cited

UNITED STATES PATENTS

| | | | |
|---|---|---|---|
| 2,733,492 | 2/1956 | Copell | 248—361 X |
| 3,182,770 | 5/1965 | Shemet | 85—5 X |
| 3,271,059 | 9/1966 | Pearson | 85—5 X |
| 3,272,059 | 9/1966 | Lyday et al. | 85—5 |
| 3,325,135 | 6/1967 | Clarke | 248—361 |
| 3,327,581 | 6/1967 | Schlueter | 85—5 |

ROY D. FRAZIER, *Primary Examiner.*

FRANK DOMOTOR, *Examiner.*